July 27, 1965
C. J. CONKLE
3,197,000
SYNCHRONIZER ASSEMBLY
Filed Sept. 6, 1962
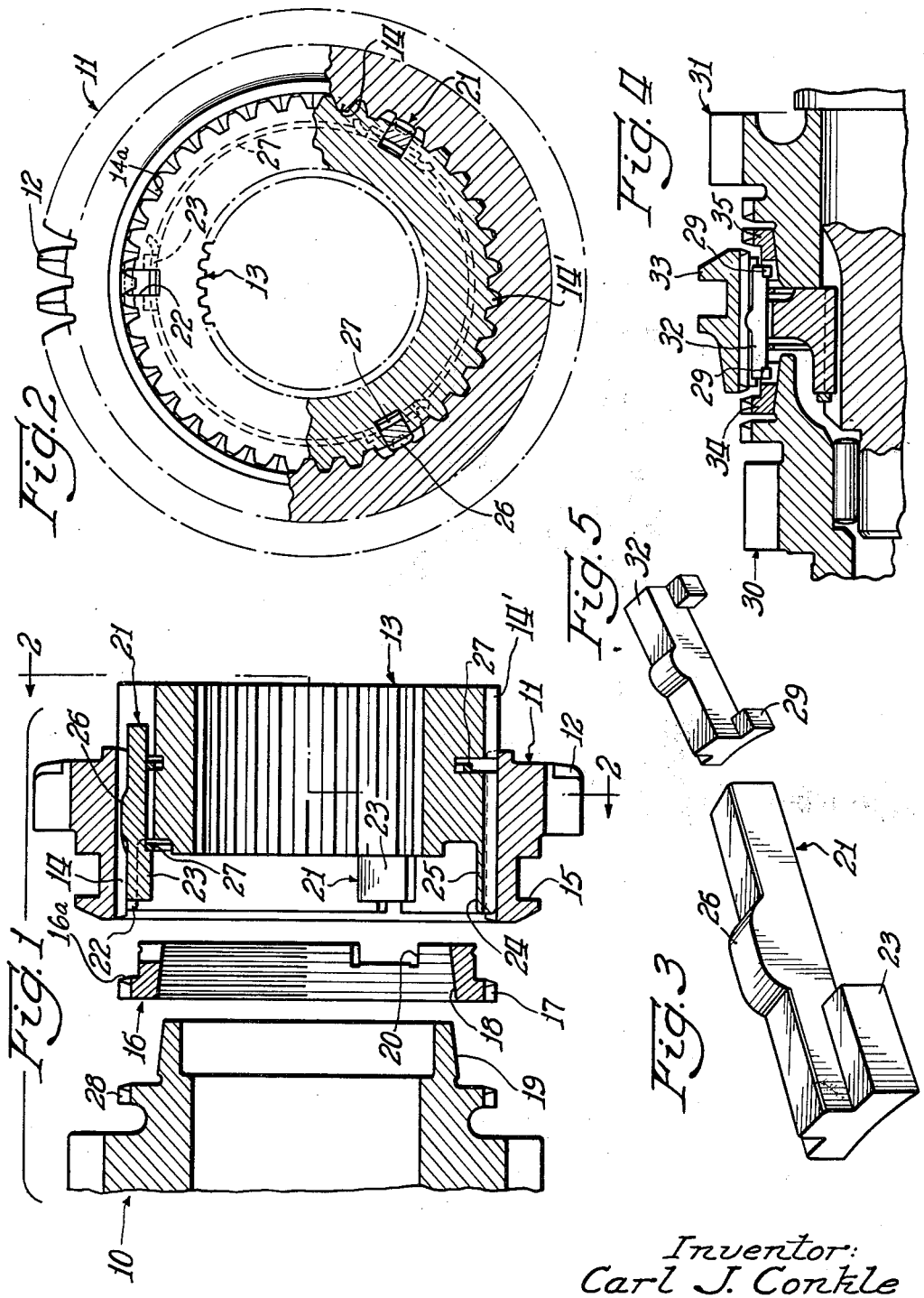
Inventor:
Carl J. Conkle
By: Robert L. Zieg

3,197,000
SYNCHRONIZER ASSEMBLY
Carl J. Conkle, Muncie, Ind., assignor to Borg-Warner Corporation, Chicago, Ill., a corporation of Illinois
Filed Sept. 6, 1962, Ser. No. 221,702
2 Claims. (Cl. 192—53)

This invention relates to a synchronizing device wherein a pair of torque transmitting members are adapted to be drivingly connected by an axially movable clutch sleeve, wherein the shifting movement of the clutch sleeve toward clutching position is blocked by a blocking element until the members are rotating synchronously.

The object of this invention is to provide an improved synchronizer of the type utilizing thrust bars to apply thrust to the blocking rings wherein means are provided to retain the thrust bars in the proper position in the assembly.

It is a more particular object of this invention to provide a synchronizing mechanism of an improved type wherein retaining lugs are formed on the synchronizer thrust bars to hold the thrust bars in position within the hub. These retaining lugs serve to keep the thrust bars within the hub when the clutch sleeve is moved by the shifting fork.

The invention consists of the novel constructions, arrangements, and devices to be hereinafter described and claimed for carrying out the above-stated objects and such other objects as will be apparent from the following description of the preferred form of the invention, illustrated with reference to the accompanying drawings, wherein:

FIGURE 1 is an exploded axial sectional view through a transmission synchronizer embodying the invention;

FIGURE 2 is a view partially in cross section taken as indicated by the line 2—2 of FIGURE 1;

FIGURE 3 is a perspective view of the thrust bar shown in FIGURE 1;

FIGURE 4 is an axial sectional view through a transmission synchronizer utilizing a modified form of the thrust bar; and FIGURE 5 is a perspective view of the thrust bar shown in FIGURE 4.

Referring to FIGURE 1, the synchronizing assembly is illustrated as used in a transmission providing synchronization when engaging the low speed gear 10. The clutch sleeve 11 engages the low speed gear 10 when moved to the left, and the external teeth 12 on the clutch sleeve engage the reverse idler gear of the transmission when moved in the opposite direction.

Torque transmitting member or hub 13 is provided which is adapted to be drivingly connected to the driven shaft of the transmission. The hub 13 thus rotates within the driven shaft of the transmission and is driven by either the reverse gear train through gear 12 or by the low speed gear train through gear 10. The clutch sleeve is provided with internal teeth 14 to engage with external teeth 14' on the hub and is also provided with a groove 15 adapted to be engaged by the shifting fork (not illustrated) to move the sleeve to its various positions. The ends of the teeth 14 on each side of the clutch sleeve 11 are chamfered as indicated at 14a in FIGURE 2. Blocking ring 16 has external teeth 17 thereon adapted to be engaged by the internal teeth on the clutch sleeve and has a conical inner surface 18 engageable with a conical surface 19 on the low speed gear 10. The teeth 17 are formed with the ends facing the clutch sleeve 11 with a chamfer as indicated at 16a in FIGURE 1. Slots 20 are provided in the blocking ring in which the ends of the thrust bars 21 are disposed. The slots 20 are wider than the thrust bars to provide the necessary lost motion connection between the clutch sleeve and the blocking ring.

The thrust bars 21 fit in grooves 22 in the hub 13 and are provided with lugs 23 which engage the inner surface 24 of the flange 25 on the hub 13. The thrust bars have a projection 26 thereon adapted to engage with a corresponding indentation in the clutch sleeve. A pair of resilient rings 27 are mounted in the hub 13 and engage the inner surface of the thrust bars 21. The resilient rings urge the thrust bars radially outwardly with the projections 26 on the thrust bars being engaged in the corresponding indentations in the clutch sleeve 11.

When the clutch sleeve 11 is moved to the left to engage the low speed gear, the thrust bars 21 will move therewith to bear against and urge the blocking ring 16 to the left until the inner conical surface 18 of the blocking ring engages the conical surface 19 on the low speed gear. This initial engagement will cause the blocking ring 16 to turn with the low speed gear and thus cause a relative rotation between the blocking ring 16 and the hub 13 in the direction of the movement of the part which is rotating at a greater speed, thus causing the chamfered surfaces of the teeth on the blocking ring 16 and the teeth 14 on the clutch sleeve 11 to move into blocking register. Continued movement of the clutch sleeve 11 will thereupon be resisted by the chamfered surfaces of the teeth 17 even though considerable force is applied to the clutch sleeve 11, tending to cause it to move into engagement with its desired positive engagement with teeth 28 on the low speed gear. This resistance to positive clutch engagement will exist until the low speed gear arrives at a synchronous speed with the clutch sleeve 11 at which point there will be a relative reversal of movement causing the blocking ring 16 to move to a position where the teeth 17 are in register with the teeth 14 on the clutch sleeve 11. When such a position is assumed, there will be no further resistance to movement of the clutch sleeve 11 and it may therefore be urged onwardly into positive clutch engagement with the teeth 28, the yielding connection between the thrust members 21 and the clutch sleeve 11 breaking away under the force applied to move the clutch sleeve 11. A positive clutching action is now provided between the clutch sleeve and the low speed gear; and the low speed gear is engaged.

The lugs 23 on the thrust bars 21 serve to retain the thrust bars within the hub 13 at all times. Certain shifts which take place in transmissions requiring long travel of the clutch sleeve create a problem in that the thrust bars will move out of the slots in the hub when this long movement takes place unless means are provided to retain the thrust bars within the hub. By use of the lugs 23 on the thrust bars as is done in the synchronizer of the subject invention, an economical and efficient method of retaining the thrust bars in position is provided. It has been found that by providing means to retain the thrust bars in position such as lugs 23, further economy has resulted in that the width of the sleeve can be reduced with this structure. Formerly, a very wide sleeve was necessary as a means of attempting to retain the thrust bars in position.

In FIGURE 4 is shown another embodiment of the invention utilizing lugs 29 on each end of a set of thrust bars 32 in a transmission where two gears are selectible and synchronization is required in each direction of movement of the clutch sleeve. Blocking rings 34 and 35 are provided on either side of clutch sleeve 33. The operation of the synchronizer in this embodiment is similar to the operation described above with reference to engaging gear 10 of FIGURE 1. The lugs 29 retain the thrust bars 32 in position when either of the gears 30 or 31 are engaged by movement of clutch sleeve 33.

It will be obvious from the above description that this invention provides an economical and simple method of retaining synchronizer thrust bars in position. Further, the synchronizer disclosed above may be used in a variety of environments where a positive clutching engagement is required between tow torque transmitting members and synchronization is necessary.

While this invention has been described in connection with certain specific embodiments thereof, it is to be understood that this is by way of illustration and not by way of limitation and the scope of this invention is defined solely by the appended claims which should be construed as broadly as the prior art will permit.

I claim:
1. In a synchronizer mechanism;
a torque transmitting member;
a rotatable part
    adjacent said torque transmitting member;
a synchronizer element
    drivingly connected to said torque transmitting member;
a clutch surface
    on said rotatable part;
a clutch surface
    on said synchronizer element, said surfaces being engageable to establish a frictional driving connection between said member and said rotatable part, said synchronizer element being shiftable axially to engage said surfaces;
a sleeve
    encircling said member and drivingly connected thereto;
engageable means
    on said rotatable part;
engageable means
    on said sleeve, said sleeve being shiftable axially to engage said engageable means and establish a positive driving connection between said member and said rotatable part;
a plurality of thrust elements
    interposed between said sleeve and said member and in engagement with said synchronizer element;
means
    fixed to said thrust elements engaged by said sleeve to provide an axial thrust transmitting association between said thrust elements and said sleeve;
means
    urging said thrust elements radially outwardly to yieldingly establish said thrust transmitting association; and
retaining means
    on said thrust elements extending therefrom and engaging with said member to limit radial outward movement of said thrust elements and said means fixed thereto to thereby retain said thrust elements in operative association with said member.

2. In a synchronizer assembly,
a torque transmitting member,
a sleeve
    surrounding said torque transmitting member shiftable axially with respect thereto,
a plurality of thrust elements
    interposed between said sleeve and said torque transmitting member having
means
    in engagement with said axially shiftable sleeve to provide for axial drive between said sleeve and said thrust element,
means
    in association with said torque transmitting member to urge said thrust transmitting elements radially outwardly into engagement with said sleeve, and said thrust elements having
means
    in engagement with said torque transmitting member to provide a limit to radial outward movement of said thrust elements and said means fixed thereto with respect to said torque transmitting member.

References Cited by the Examiner

UNITED STATES PATENTS 2,221,900   11/40   White et al.
2,941,641    6/60   Stump.

DAVID J. WILLIAMOWSKY, *Primary Examiner.*
BROUGHTON G. DURHAM, *Examiner.*